(No Model.) 5 Sheets—Sheet 1.

A. W. KENDRICK & C. A. VAN DUZEE.
FANNING MILL.

No. 299,077. Patented May 20, 1884.

Witnesses:
T. E. Brecht
Guy L. DeMotte

Inventors:
Andrew W. Kendrick
Charles A. Van Duzee

N. PETERS. Photo-Lithographer, Washington, D. C.

(No Model.) 5 Sheets—Sheet 2.

A. W. KENDRICK & C. A. VAN DUZEE.
FANNING MILL.

No. 299,077. Patented May 20, 1884.

Witnesses:
T. C. Brecht
Guy L. DeMotte

Inventors:
Andrew W. Kendrick
Charles A. Van Duzee (No Model.) 5 Sheets—Sheet 3.
A. W. KENDRICK & C. A. VAN DUZEE.
FANNING MILL.
No. 299,077. Patented May 20, 1884.
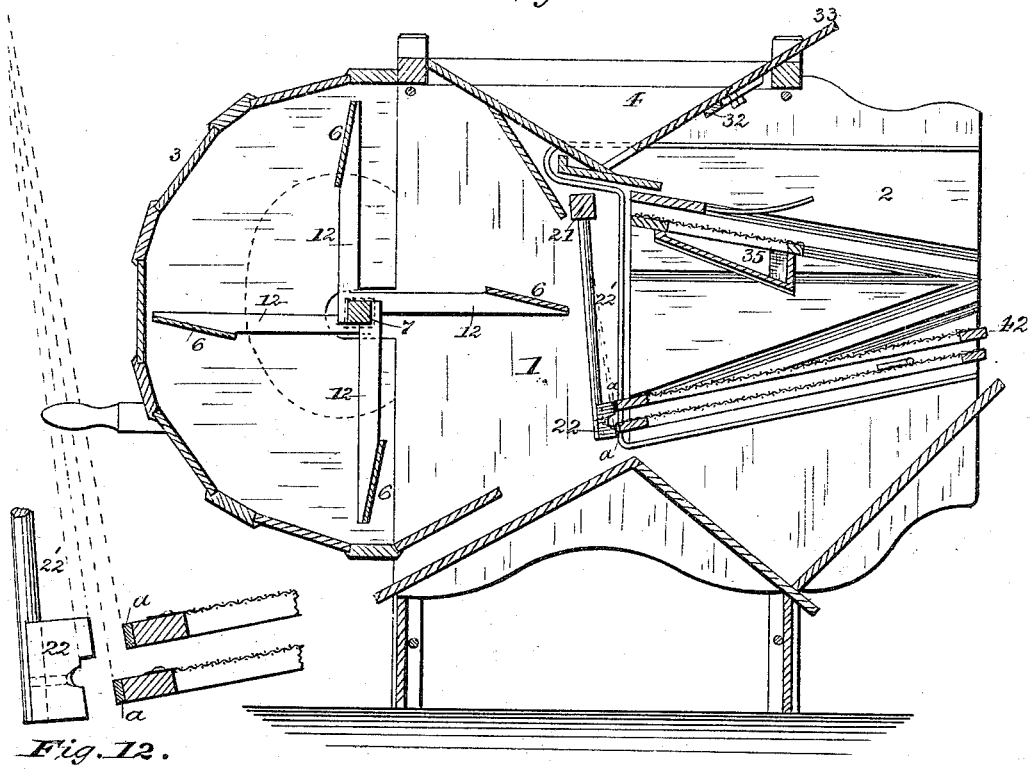
Fig. 3.
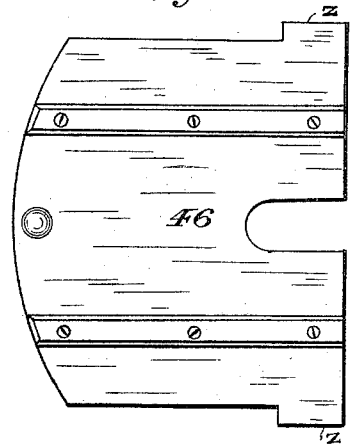
Fig. 12.
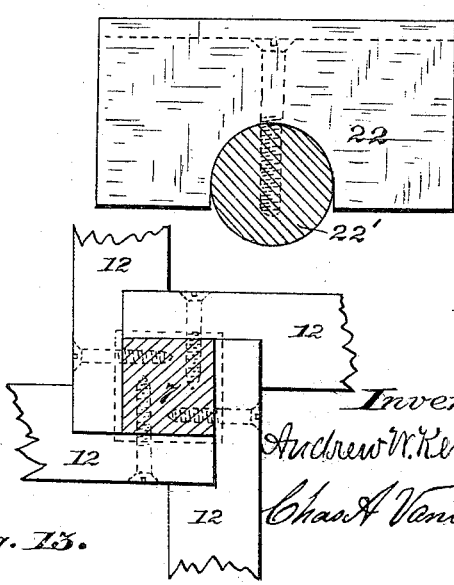
Fig. 6.
Fig. 7.
Fig. 13.
Witnesses:
T. C. Brecht
Guy L. DeMotte
Inventors:
Andrew W. Kendrick
Chas. A. Van Duzee

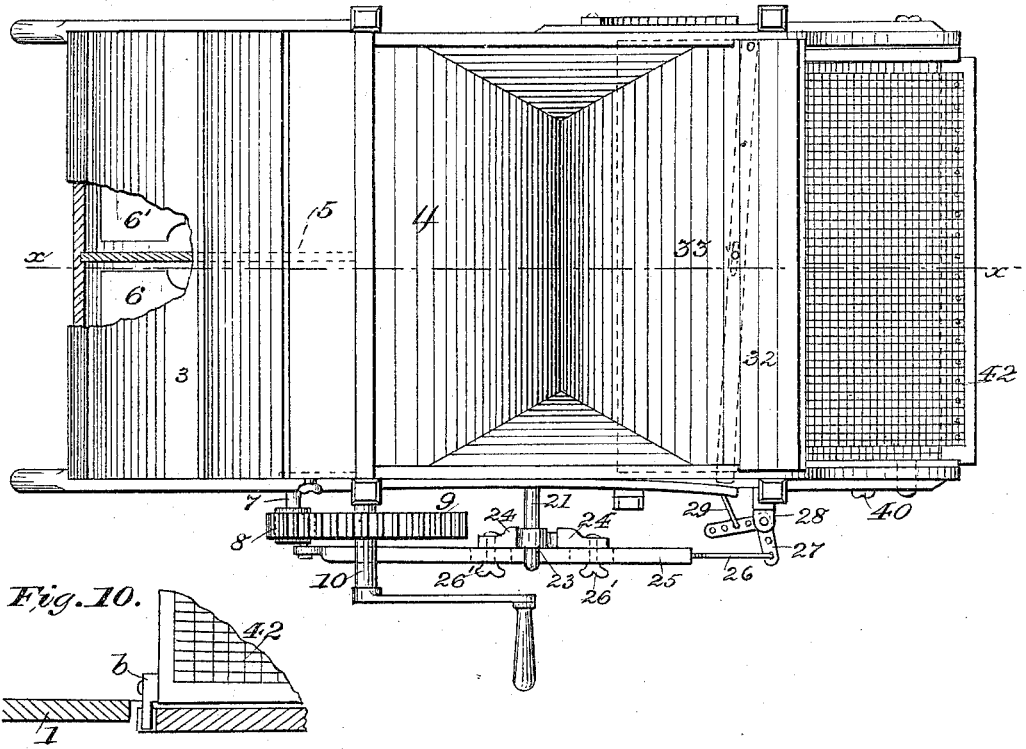

(No Model.) 5 Sheets—Sheet 5.

A. W. KENDRICK & C. A. VAN DUZEE.
FANNING MILL.

No. 299,077. Patented May 20, 1884.

Witnesses:
T. C. Brecht
Guy L. DeMotte

Inventors:
Andrew W. Kendrick
Charles A. Van Duzee

UNITED STATES PATENT OFFICE.

ANDREW W. KENDRICK, OF BROOKLYN, AND CHARLES A. VAN DUZEE, OF GOUVERNEUR, NEW YORK.

FANNING-MILL.

SPECIFICATION forming part of Letters Patent No. 299,077, dated May 20, 1884.

Application filed January 30, 1884. (No model.)

*To all whom it may concern:*

Be it known that we, ANDREW W. KENDRICK, of the city of Brooklyn, in the county of Kings and State of New York, and CHARLES A. VAN DUZEE, of Gouveneur, in the county of St. Lawrence and State of New York, have jointly invented certain novel and useful Improvements in Fanning-Mills for Cleaning and Grading all Kinds of Grain and Seeds, of which the following is a full, clear, and exact description, reference being had therein to the accompanying drawings, in which—

Figure 1:
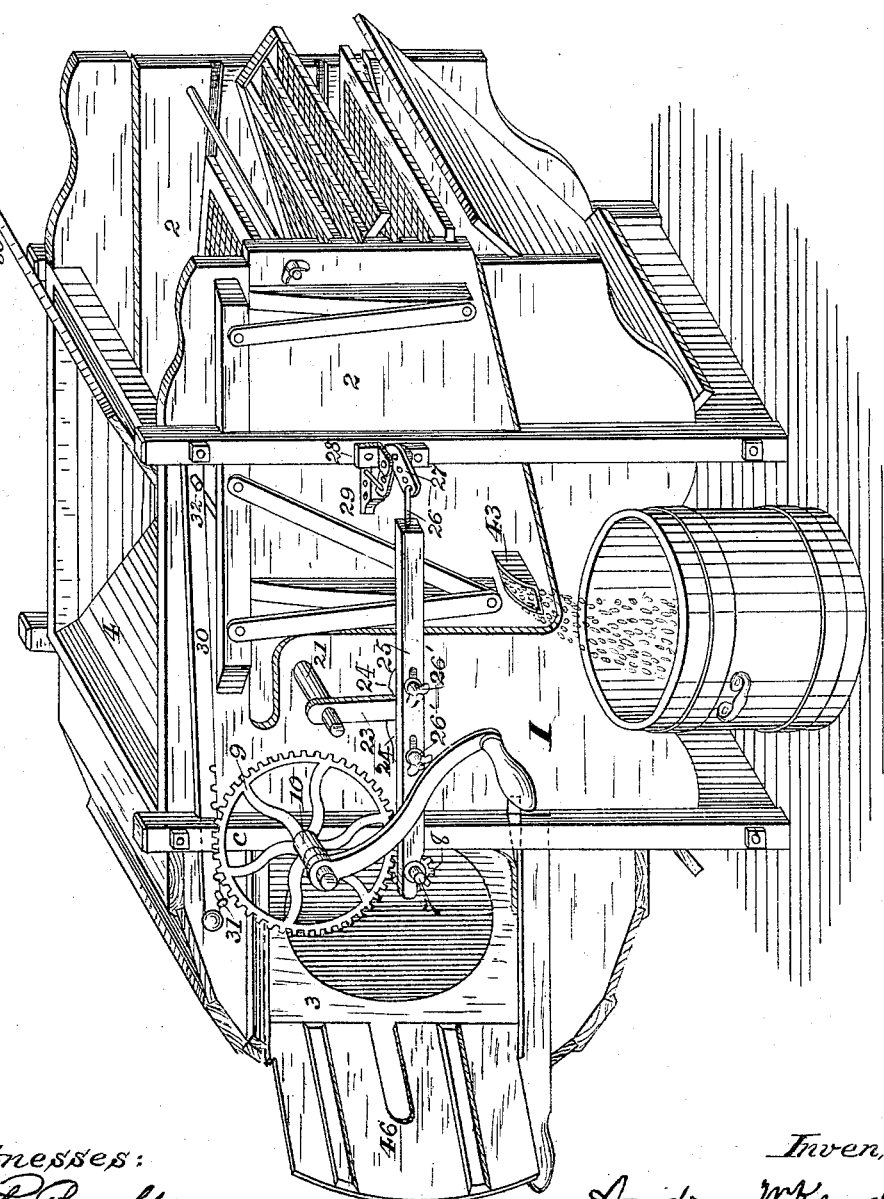
Figure 2:
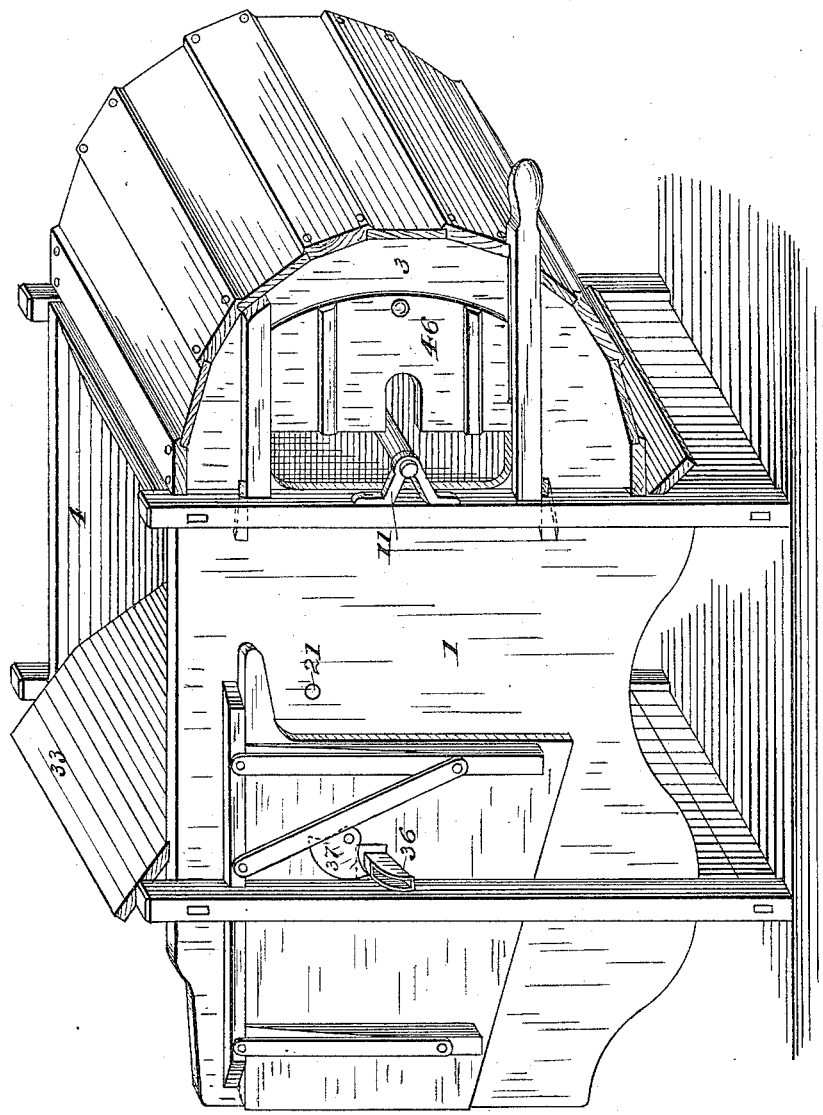
Figure 11:
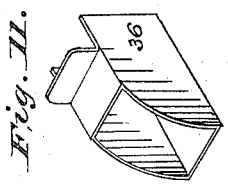
Figure 9:
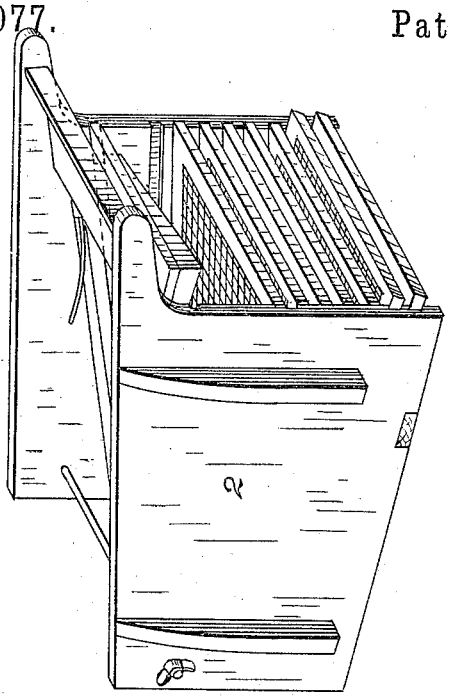
Figure 8:
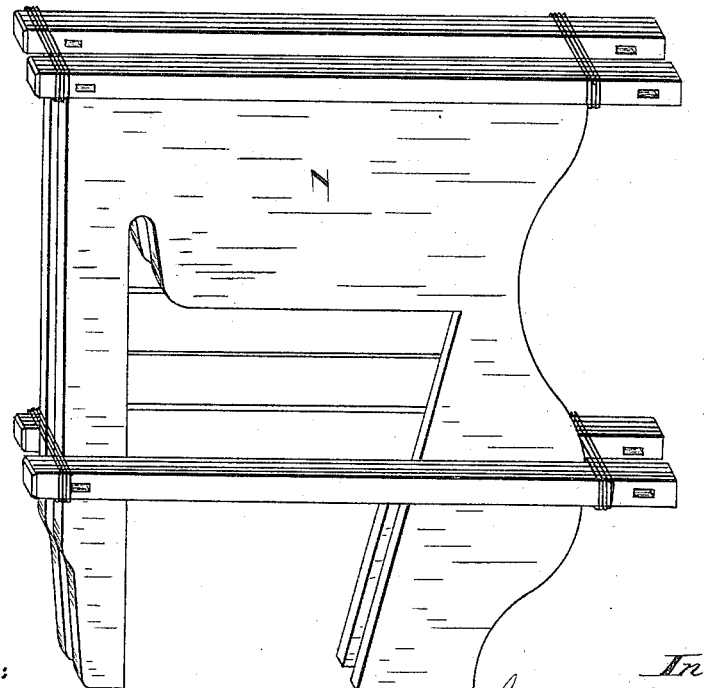

Figure 1 is a perspective view, from the right hand or operator's side, of the fanning-mill, showing the feed-adjusting device and the mechanism for communicating motion to the screens. Fig. 2 is a perspective view of the opposite side showing our improved cockle-spout. Fig. 3 is a longitudinal sectional elevation taken in the plane of section-line $x\,x$, Fig. 5, showing the internal construction and arrangement. Fig. 4 is a sectional plan view taken substantially in the plane of the axis of the fan-shaft, showing the interior of the fan-drum with its central partition, the double fan, and the screens. Fig. 5 is a top plan view. Fig. 6 is a view of one of the valves or doors of the fan. Fig. 7 is a detail top view of the knocking-hammer. Fig. 8 shows the framework of the mill as taken apart and packed for transportation. Fig. 9 shows the shoe as packed for transportation. Fig. 10 is a detail view showing one of the buttons for securing the lower sieves. Fig. 11 is a detail view of the cockle-spout detached. Fig. 12 is a detail sectional view of the sieves, showing their position, the wearing-plates, and the knocking-hammer; and Fig 13 comprises detail views of the fan-shaft and the mode of securing the arms of the fan thereto.

The same numbers or letters of reference designate the same or corresponding parts in all the figures.

Our invention consists in certain novel features of construction and arrangement which will first be described, and then particularly pointed out in the claims.

In the drawings, 1 designates the frame or body of the machine. The shoe 2 is suspended by suitable straps, as shown, to permit lateral vibration. The fan-case 3 is detachably secured to the frame 1 in the usual or in any suitable manner. 4 is the feed-hopper.

The fan case or drum 3 is constructed of two semicircular end pieces or heads, cut away for the ingress of air, a semicircular central partition, which has in the middle a horizontal recess or slot (shown in Fig. 3) to receive the fan-shaft, and a series of alternately thick and thin boards, forming the periphery of the drum. These boards are grooved transversely in the middle to fit over the edge of the central partition, and at the ends rabbeted to fit over the edges of the heads of the drum, the thicker boards being each rabbeted along both its longitudinal edges to overlap the alternating thin boards and bend them down firmly and tightly upon the drum-heads and partition. It will be seen that by this construction the necessity of previously conforming the thinner boards to the outline of the drum-heads is avoided, and that these thinner pieces do not require to be nailed, the grooves and rabbeting in them, and the overlapping boards, which are nailed or screwed down at each end, as shown in Fig. 2, being sufficient to hold them firmly in position. It will also be seen that this lessens the cost and the time required for setting up the mill for operation.

The fan-shaft 7 is journaled in detachable brackets 11. The blades 6 6' of the double or divided fan are detachably secured upon the fan-shaft by means of their arms 12, which are cut away or halved at their inner ends for a certain distance, as shown in Fig. 13, and secured by means of a screw in a corresponding groove upon a side of the fan-shaft, as shown in Fig. 13, so that each arm sets over the end of the preceding one, and is, as it were, stepped between the next and the fan-shaft, and is as firmly supported as if stepped in a shaft of twice the diameter of shaft 7. The advantages of this construction are, that the blades are readily detached when the mill is to be packed in smaller compass for transportation, and the blades and their arms have, when unshipped, only half the diameter of the fan, and there is therefore no difficulty in packing them along with the drum-heads, boards, &c., as shown in Fig. 9, and, lastly, that the fan-shaft is not weakened by being mortised through for the reception of the fan-arms and consequently may be made lighter and of smaller diameter, lessening the quantity of material needed, and making a more lightly-running fan.

The central partition, 5, is designed to obviate the disadvantage of the unequal blast which results from the employment of the single fan and fan-chamber ordinarily employed, in which, as we have practically experienced, a blast strong enough to clean the grain properly in the central line of the shoe is insufficient to clean the grain along the sides, where the same class of lighter matters which, in the middle, are blown out over the sieves, may be seen running down, along with the good grain, toward the fan, while if the blast be increased to remedy this, good grain will be carried over with the light grain and refuse. If two distinct fans and fan-cases are employed, with a central inlet in the drum for air, the same result is produced in duplicate, the blast being strongest in two lines between the sides and center of the shoe, and weakest in the center and at the sides, while the space required for the central air-inlets and drum-heads necessarily diminishes by this much the area and power of the fan-blades. To obviate this difficulty we have devised the central partition, 5. It is substantially semicircular, projecting more or less beyond the fan-shaft, being cut away to fit over it, as shown in Fig. 3. The boards forming the perimeter of the fan-drum are transversely grooved at the middle of their length, and fit tightly over the rounded edge of partition 5, which thus divides the drum into two non-communicating air-chambers. The partition 5 is preferably not a full disk, but cut away, as shown, within the circle described by the fan-blades, so that the two currents of air which are drawn in at the eyes of the fan-drum along the axis of the fan, and are suddenly condensed against the central partition, rebound therefrom, and are united and thrown through the shoe, expanding into a blast of equal force across its width. The arrows in Fig. 4 are intended to express our understanding of the manner in which the air is drawn in, suddenly checked, and caused to change its direction, caught in the moment of its elastic expansion, and driven onward in a united current through the shoe. We have found in practice that this equalizes the winnowing action throughout the width of the screens without the aid of lateral deflectors or other additional means of regulating the blast.

A difficulty heretofore experienced in the adjustment of the fan-valves 46 is that from the necessities of construction the boards or staves forming the perimeter of the drum project slightly over the edges of the drum-heads, and it has consequently been impossible to draw out a valve of the width required to cover the eye of the drum far enough to leave open the whole eye. In order to permit the valve to be drawn beyond the outline of the drum, we have cut away the top and bottom thereof, leaving only the small portions $z\ z$ at the top and bottom, at the inner edge, to fit somewhat loosely into the grooves in the upper and lower horizontal cleats at the ends of the fan-drum, as shown in Fig. 1, so that the outer edge may be pulled outward laterally far enough to clear the ends of the drum-staves, as shown in Figs. 1 and 6. It will also be seen that this construction permits the valve to be tilted and detached.

The rear side of the hopper 4 is formed as a slide, 33, held in by the usual guide-strips. In order to place this slide, and consequently the feed, under the observation and control of the operator without obliging him to change his position or interrupting the running of the mill, we have arranged a lever, 32, beneath the slide, pivoted at its farther end on the left-hand side of the machine, and at its middle provided with a pin, which engages a transverse slot or recess in the under face of the slide-board 33, (see Figs. 3 and 5,) permitting the required play of the pin, while the free end of the lever extends through an inclined guide-slot (see Fig. 1) cut through the side casing in planes parallel to the slide-board. A link or push-bar, 30, is connected with the projecting end of lever 32, and extends forward through a mortise in the post $c$, below the upper outline of the casing, and terminates in a knob or handle just over the driving crank-wheel 9. The under side of the push-bar is notched and fits over a rest-pin, as shown. The under edge of the push-bar 30 is notched, as plainly shown in Fig. 1, and the push-bar thus engages a pin, 31, on which it rests, and thus holds the feed-slide firmly at any desired point. The advantages of this construction are that the operator, while turning the crank-wheel with his right hand, may adjust the feed without changing his position; that the adjustment is direct, as the slide moves back when the push-bar is moved back, and vice versa, and the adjustment is self-securing, as the notches on the under side of the bar 30 cause it to engage by its own weight with the rest-pin 31. Lastly, none of the parts project beyond the outline of the mill, and are not in the way, and are not liable to be broken or lost.

The toothed crank-wheel 9 is journaled upon a stub-axle, 10, secured to the side post, $c$, of the frame, and communicates motion to the fans through a pinion, 8, secured upon the end of the fan-shaft. To this pinion, by means of a crank-pin, as shown, is pivoted a wooden pitman, 25, into the outer end of which is screwed a threaded metallic rod, 26, having its outer end bent at a right angle to engage any desired one of several adjustment-holes in the outer arm of an elbow-lever, 27, the inner arm of which, perforated similarly, is connected through a link, 29, to a bracket or block, 28, which may be likewise perforated with adjustment-holes rigidly secured to the side of the shoe 2. By changing the position of link 29 and turning the screw-rod 26, so that the pitman is lengthened or shortened, the shake of the shoe is increased or diminished without interfering with the knocker hereinafter described.

In the interior of the shoe, near the bottom, the screens 42 are arranged, one above the other, in parallel planes inclining downward toward the fan, the upper screen exposing its surface to the fan, so that when the material is stirred up by the knocker the light matters are carried out over the upper end of the screen by the blast, and the lower screen delivering the second grade of grain upon a chute-board, as shown, which conducts it to any suitable receptacle beneath the fan. These screens, in addition to their transverse shape, are jarred endwise by means of the swinging knocker, presently to be described, and are withheld from endwise displacement by buttons $b\ b$, one near each corner, which, when turned down, engage notches in the side plates of the shoe, as plainly shown in Figs. 4 and 10. It is manifest that many equivalent devices—as pins 40, thrust through perforations in the side plates of the shoe, &c.—might be substituted in this relation without affecting the essential character of the invention.

Metallic plates $a\ a$, which sharpen the jar of the knocker and prevent the wear of the sieve-frames, are fastened upon the portions of the same which receive its blows. These plates must be made of greater length than the width of the face of the knocker on account of the transverse reciprocation of the shoe. The grading-screen 42 delivers the best or largest and heaviest grain and seed through an opening in the side of the shoe by means of a bar, 44, secured in an oblique position upon the screen, and operating to arrest the best grain or seeds and direct it through spout 43 to a suitable receptacle. In the upper part of the shoe are slid a cockle-screen and box, having a laterally-sloping bottom arranged to discharge the cockle through an opening in the side of the shoe. This arrangement economizes space in the shoe, and the bottom of the box acts to deflect the blast upon the screen below. The cockle-screen is secured upon the box, and the whole is readily removed in changing the screens. For the discharge of the cockle a square tube or spout, 36, (see Fig. 11,) is inserted through the opening in the side of the shoe. This spout has an upwardly-turned flange on its upper side, as shown, which lies flat against the side of the shoe. The flange is held by a plate, 37, pivoted above the spout, and when the cockle-box and spout are not in use this plate is dropped over the opening to prevent the escape of grain or seeds.

Centrally of the width of the machine is a metallic knocker, 22, having two striking-faces in different planes, as shown in Fig. 12, so as to jar the two lower screens simultaneously. It is secured by means of a screw to a long arm, 22', rigidly connected at its upper end to a rock-shaft, 21, journaled transversely in the upper part of the mill, and having the end on the operator's side projecting through the casing, and provided with a rigid depending arm, 23, which extends down between two blocks, 24 24, secured on the inner side of the pitman 25 by means of tension-bolts and thumb-nuts 26', said bolts passing through slots in the pitman, as shown. These slots are of such a length and distance from each other that they may be brought together so as to positively hold the arm 23, and thereby deliver what may be termed a "rigid blow" upon the lower screens, the hammer remaining in contact with the screen-frame for an instant after the blow; or they may be so moved as to cause but one of the blocks 24 24 to strike the depending arm 23, and thus produce a loose swinging blow, the hammer rebounding from each stroke; or, lastly, the blocks may be moved so far apart upon the pitman as never to come into contact with the depending arm 23, so that the hammer hangs idle and out of contact with the screens. These adjustments have reference to the different kinds and conditions of grain or seeds to be treated. The general effect of this blow, delivered endwise upon the screens, is to cause the mass of grain to slide and roll with increased velocity down the screens to clear the mesh of grain, &c., lodged therein, and to cause the dust and lighter impurities to be stirred up, seized by the blast, and carried out over the upper ends of the screens. The grain, &c., is not caused to bounce up, as is the result where a hammer striking up from underneath, is used. Such a blow causes the material to choke the mesh, and the difficulty is increased by the blast driving it into the mesh in this condition. Our knocker, striking the seive nearly in the line thereof, causes the grain to slide rapidly over the mesh in a mass, in which the lightest materials work readily to the top and are skimmed off and carried at once out of the machine by the blast.

It is obvious that instead of a metallic hammer and suspending-shank a mere wooden knocking-bar might be used without departing from the spirit of our invention.

When the fanning-mill is to be put up for transportation, the shoe containing all its sieves and other appurtenances, as shown in Fig. 9, is removed and forms one package. The boards forming the fan-drum, fan, and partitions, the hopper, and the bottom chutes, and the cross-girts and tie-rods which bind the two sides of the rectangular main frame together are placed between these two sides, as seen in Fig. 8, and the posts bound together at top and bottom, as therein plainly shown, forming the second package, substantially rectangular in form, and occupying very little more than one-third the cubic space of the machine when set up for operation.

Having thus described our invention, what we claim, and desire to secure by Letters Patent, is—

1. The combination, with the frame 1, of the detachable fan-drum, composed of the drum-heads, the central partition, the thin boards, the thick boards rabbeted and grooved to receive said heads and partition, the grooved and rabbeted boards alternating with and overlapping the thin boards, and means for securing the overlapping boards upon the drum-heads, substantially as and for the purpose set forth.

2. In a fanning-mill, the combination of a main frame or casing made in detachable sections and rectangular in form, a fan-drum made in detachable sections, and a fan having separately detachable blades and detachable shaft, whereby the fanning-mill frame and fan are rendered reducible to a single compact package, as hereinbefore set forth.

3. The combination of the fan-shaft having plain faces or sides, the detachable fan-blades having arms halved or cut away at their inner ends and adapted to fit over each other in succession upon the fan-shaft, and means for detachably securing them to the fan-shaft, substantially as and for the purpose set forth.

4. The combination of the screens, the fan having a double or divided set of blades, the single continuous fan-drum having air-inlets, and the stationary vertical central partition dividing the drum into two non-communicating air-chambers, substantially as and for the purpose set forth.

5. The combination of the shaking screens, the fan having a double or divided set of blades, the single continuous fan-drum having an air-inlet at each end, and the stationary vertical central partition dividing said drum into two non-communicating air-chambers, said partition being cut away on the rear edge within the circle described by the fan, substantially as and for the purpose set forth.

6. The combination of the fan, the fan-drum, the grooved cleats, and the valve-board having the top and bottom projections at its inner edge adapted to enter the grooves, substantially as and for the purpose set forth.

7. The combination of the main frame, the hopper constructed with the feed-slide, the lever pivoted at one end to the frame and at its middle engaging the feed-slide, the casing having the inclined guide-slot, the post mortised below the upper line of the casing, the rest-pin, and the push-bar connected with the lever at one end, and notched on its under side and extending above the crank-wheel through the mortise, substantially as and for the purpose set forth.

8. The combination of a blast-fan, a reciprocating-screen inclined downwardly toward the blast-fan, with its upper surface exposed thereto, a knocker, and means for causing it to deliver a blow endwise against the end of the screen nearest the fan, substantially as and for the purpose set forth.

9. The combination of a fan, a pitman, a screen receiving its motion from the fan-shaft through the pitman, a rock-shaft, a knocker suspended from the rock-shaft, and means connecting said rock-shaft with said pitman, substantially as and for the purpose set forth.

10. The combination of a crank-shaft, a pitman, a screen receiving its motion therefrom, a swinging knocker, and means, substantially as described, by which said knocker and pitman may at will be connected positively or loosely to give a swinging blow, substantially as set forth.

11. The combination of a blast-fan, a shaking screen, a knocker suspended between said fan and said screen, and mechanism, substantially as described, for operating the screen and knocker.

12. The combination of a pitman, means for reciprocating said pitman, the screen, the knocker, the rock-shaft having the depending arm, and the adjustable blocks, substantially as and for the purpose set forth.

13. The combination of the shoe, the screen, the knocker striking the end of the screen, the buttons for retaining the screens in place against the blows of the knocker, and means, substantially as described, for operating the knocker and screen, substantially as and for the purpose set forth.

14. The combination, with the crank-shaft, the shoe, the swinging knocker, and the mechanism connecting it to the pitman, of the pitman adjustable in length, the elbow-lever, and the link connecting it to the shoe, substantially as set forth.

15. The combination of the shoe having the opening in the side plate, the detachable cockle-screen and box, the detachable spout having the flange, and the pivoted plate, substantially as and for the purpose set forth.

16. The combination of the shoe having the discharge-opening in the side plate, the detachable spout having the flange on its upper side, and the pivoted plate, said plate being adapted to confine the spout in position and to close the discharge-opening in the absence of the spout, substantially as set forth.

In testimony whereof we affix our signatures in presence of two witnesses.

ANDREW W. KENDRICK.
CHARLES A. VAN DUZEE.

Witnesses:
T. C. BRECHT,
GUY. L. DE MOTTE.